United States Patent
Xue et al.

(10) Patent No.: US 10,280,480 B2
(45) Date of Patent: May 7, 2019

(54) LASER SHOCK PEENING METHOD AND DEVICE FOR BOTTOM SURFACE OF TENON GROOVE OF AIRCRAFT BLADE

(71) Applicants: Wenzhou University, Wenzhou (CN); Jiangsu University, Zhenjiang (CN); Southeast University, Nanjing (CN)

(72) Inventors: Wei Xue, Zhejiang (CN); Jinzhong Lu, Zhenjiang (CN); Mi Luo, Zhenjiang (CN); Yongkang Zhang, Nanjing (CN); Fengze Dai, Zhenjiang (CN)

(73) Assignees: Wenzhou University, Wenzhou, Zhejiang (CN); Jiangsu University, Zhenjiang, Jiangsu (CN); Southeast University, Nanjing, Jiangsu (CN)

( * ) Notice: Subject to any disclaimer, the term of this patent is extended or adjusted under 35 U.S.C. 154(b) by 414 days.

(21) Appl. No.: 14/914,799

(22) PCT Filed: Oct. 23, 2013

(86) PCT No.: PCT/CN2013/085743
§ 371 (c)(1),
(2) Date: Feb. 26, 2016

(87) PCT Pub. No.: WO2015/027555
PCT Pub. Date: Mar. 5, 2015

(65) Prior Publication Data
US 2016/0215362 A1     Jul. 28, 2016

(30) Foreign Application Priority Data
Aug. 29, 2013 (CN) .......................... 2013 1 0384555

(51) Int. Cl.
*C21D 10/00* (2006.01)
*B23K 26/073* (2006.01)
(Continued)

(52) U.S. Cl.
CPC ........ *C21D 10/005* (2013.01); *B23K 26/0622* (2015.10); *B23K 26/0738* (2013.01);
(Continued)

(58) Field of Classification Search
CPC ............ B23K 26/0069; B23K 26/0622; B23K 26/0738; B23K 26/0861; B23K 26/146; B23K 26/356; C21D 10/005
See application file for complete search history.

(56) References Cited

U.S. PATENT DOCUMENTS 5,522,706 A * 6/1996 Mannava ............. C21D 10/005
416/215
5,846,054 A * 12/1998 Mannava ................ F01D 5/286
416/219 R
(Continued)

FOREIGN PATENT DOCUMENTS

CN           1227877 A      9/1999
CN         101256287 A      9/2008
(Continued)

OTHER PUBLICATIONS

Machine translation of Japan Patent document No. 09-061,610-A, Sep. 2018.*
(Continued)

*Primary Examiner* — Geoffrey S Evans
(74) *Attorney, Agent, or Firm* — TraskBritt

(57) ABSTRACT

A laser shock peening method and device for a bottom surface of a tenon groove of an aircraft blade. During the laser shock peening process, according to geometric characteristics of the bottom surface of a tenon groove, a circular facula of a laser beam is changed into a strip-shaped facula, at the same time as a flow-guiding injection device and a water pumping device are respectively arranged at two end
(Continued)

surfaces of the bottom surface of the tenon groove to ensure the stability of a water confinement layer.

5 Claims, 3 Drawing Sheets

(51) Int. Cl.
  *B23K 26/356* (2014.01)
  *B23K 26/0622* (2014.01)
  *B23K 26/146* (2014.01)
  *B23K 26/08* (2014.01)
  *C21D 9/00* (2006.01)

(52) U.S. Cl.
  CPC ........ *B23K 26/0861* (2013.01); *B23K 26/146* (2015.10); *B23K 26/356* (2015.10); *C21D 10/00* (2013.01); *C21D 9/0068* (2013.01)

(56) References Cited

U.S. PATENT DOCUMENTS

| | | | |
|---|---|---|---|
| 5,911,890 A | 6/1999 | Dulaney et al. | |
| 5,935,464 A * | 8/1999 | Dulaney | C21D 10/005 219/121.65 |
| 5,988,982 A * | 11/1999 | Clauer | C21D 10/005 219/121.62 |
| 6,236,016 B1 | 5/2001 | Dulaney et al. | |
| 6,333,488 B1 | 12/2001 | Lawrence et al. | |
| 7,321,105 B2 * | 1/2008 | Clauer | C21D 10/005 219/121.85 |
| 2004/0226637 A1 * | 11/2004 | Dulaney | C21D 10/005 219/121.6 |
| 2006/0102609 A1 * | 5/2006 | Dane | C21D 10/005 219/121.85 |
| 2010/0061863 A1 * | 3/2010 | Delvaux | C21D 10/005 416/241 R |
| 2011/0253690 A1 * | 10/2011 | Dane | G02B 27/0927 219/121.74 |
| 2012/0325788 A1 * | 12/2012 | Sokol | B23K 26/0069 219/121.75 |
| 2015/0368744 A1 * | 12/2015 | Zhang | C21D 10/005 239/73 |

FOREIGN PATENT DOCUMENTS

| | | | |
|---|---|---|---|
| CN | 103203543 A | | 7/2013 |
| CN | 103203543 B | | 3/2015 |
| JP | 09-061610 A | * | 3/1997 |
| JP | 2005-000952 A | * | 1/2005 |
| WO | 2015027555 A1 | | 3/2015 |

OTHER PUBLICATIONS

Machine translation of Japan Patent document No. 2005-000,952-A, Sep. 2018.*
PCT International Search Report, PCT/CN2013/085743 dated Jun. 4, 2014 with English translation.

* cited by examiner

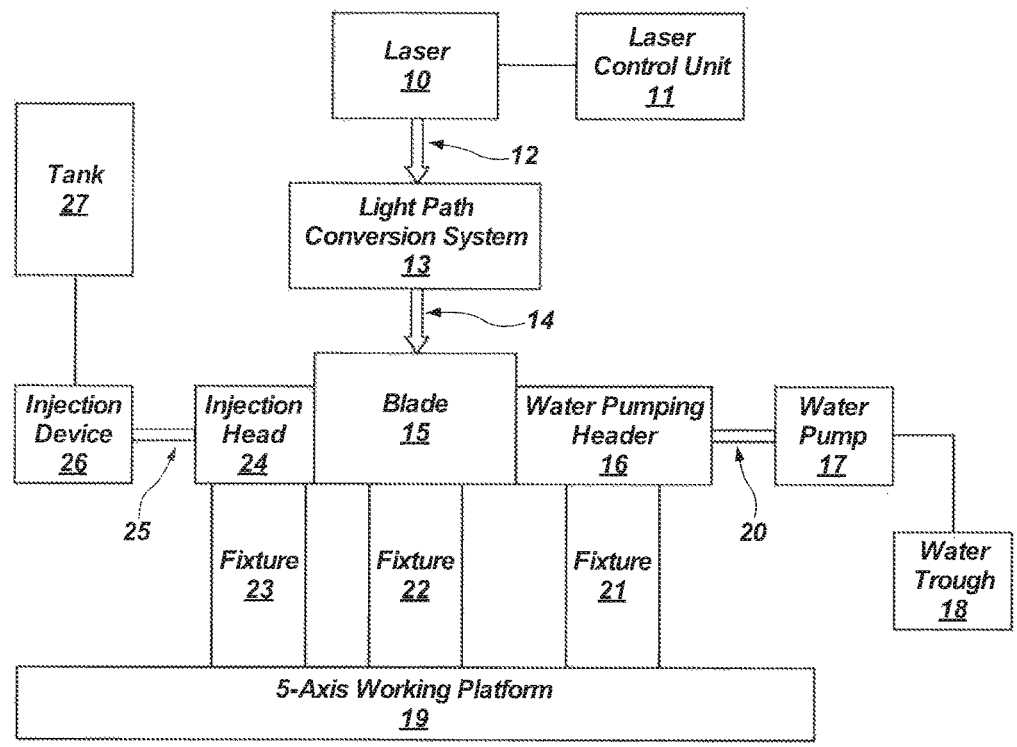
FIG. 3
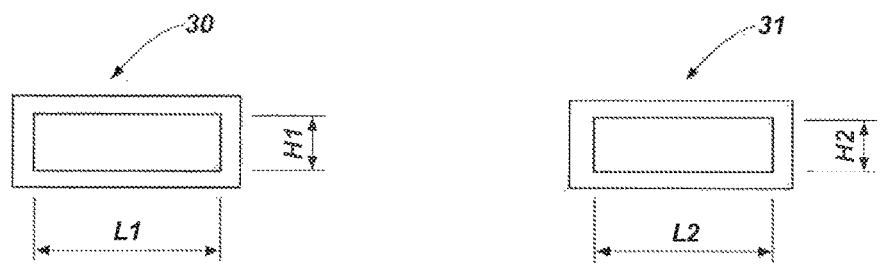
FIG. 4
FIG. 5

LASER SHOCK PEENING METHOD AND DEVICE FOR BOTTOM SURFACE OF TENON GROOVE OF AIRCRAFT BLADE

CROSS-REFERENCE TO RELATED APPLICATIONS

This application is a national phase entry under 35 U.S.C. § 371 of International Patent Application PCT/CN2013/085743, filed Oct. 23, 2013, designating the United States of America and published as International Patent Publication WO 2015/027555 A1 on Mar. 5, 2015, which claims the benefit under Article 8 of the Patent Cooperation Treaty and under 35 U.S.C. § 119(e) to Chinese Patent Application Serial No. 201310384555.6, filed Aug. 29, 2013, the disclosure of each of which is hereby incorporated herein in its entirety by this reference.

TECHNICAL FIELD

This disclosure relates to the laser processing field, in particular, to a laser shock peening technique for the bottom surface of a tenon groove of an aircraft blade, which can improve the reliability of connection between the aircraft blade and a blade disc and prolong the service life of the aircraft blade.

BACKGROUND

Engine is the power source and also heat of an aircraft. Blades are special parts that are in a large quantity and complex in shape, have high precision criteria, and are difficult to process. They are always the key items in engine manufacturing plants, and are reputed as the "heart of heart." Aircraft blades are connected to tenon grooves in the blade disc by means of the tenons on the bottom of the blades; therefore, the bottom surface of the tenon groove of the tenons of an aircraft blade is a typical stress-concentrated area. When the engine operates, fatigue cracks may occur and develop on the bottom surface of the tenon groove, resulting in blade looseness, vibration, or unbalance, and thereby causing severely compromised engine safety and reliability, reducing service life, and increasing maintenance cost. Hence, it is of crucial importance to carry out surface peening for the bottom surface of the tenon groove to reduce abrasion and inhibit occurrence and development of fatigue cracks.

Laser shock peening (LSP), which is also referred to as laser shot blasting, is a new material surface strengthening technique. LSP utilizes the mechanical effect of shock wave induced by strong laser to process the material, and has the features of high pressure, high energy, super-rapid and super-high strain rate, etc. Residual compressive stress layer formed by LSP can effectively eliminate stress concentration in the material and inhibit crack occurrence and development, and thereby significantly improve the fatigue life, corrosion resistance, and wear resistance of metal parts. It has been proven through many studies that LSP is an effective means for extending crack occurrence time, reducing crack development speed, and improving material life.

However, the bottom of the tenon groove of the tenon of the aircraft blade is very narrow, usually only several millimeters. During a LSP process, the laser beam irradiates the side wall of the bottom of the tenon groove and produces plasma therein first, creating a "plasma shielding" effect, which hinders the laser beam from irradiating to the bottom surface of the tenon groove and affecting the effect of LSP. In addition, owing to the strong wall-attachment effect of water flow, it is difficult to form a uniform and stable water confinement layer on the bottom of the tenon groove, which also affects the effect of LSP. However, the bottom of the tenon groove is a part that is easy to fail, and surface peening is especially desired.

BRIEF SUMMARY

The object of this disclosure is to provide a laser shock peening method and device for the bottom surface of a tenon groove of an aircraft blade, which can avoid the "plasma shielding" phenomenon and create a uniform and stable water confinement layer, and thereby enhance the LSP effect.

To solve the technical problem described above, according to the geometric characteristics of the bottom of a tenon groove, a light path conversion system is utilized in this disclosure to change a circular facula of a laser beam into a strip-shaped facula with high-power density, so as to carry out laser shock peening for the bottom surface of the tenon groove. In addition, a flow-guiding injection device and a water pumping device are arranged, respectively, on the two end surfaces of the bottom of the tenon groove to create a uniform and stable water confinement layer. The specific technical scheme is as follows:

A laser shock peening method for the bottom surface of a tenon groove of an aircraft blade, the method comprising: utilizing a light path conversion system to change a laser beam with a circular facula into a laser beam with a strip-shaped facula and high-power density, so as to carry out laser shock peening for the bottom surface of a tenon groove that is covered by an absorbing layer, according to the geometric characteristics of the bottom of the tenon groove; meanwhile, utilizing a flow-guiding injection device and a water pumping device and controlling the water flow parameters at the water inlet end and water outlet end on the bottom of the tenon groove, respectively, to create a uniform and stable water confinement layer having a thickness of 1 mm-1.5 mm.

The laser beam with a strip-shaped facula has a width of 0.5 mm-1 mm and a length of 7 mm-14 mm, with 5 J-12 J of pulse energy and 10 ns-30 ns of pulse width.

A device that implements the laser shock peening method for the bottom surface of a tenon groove of an aircraft blade, the device comprising: a laser 10, a laser control unit 11, a light path conversion system 13, a five-axis working platform 19, a first fixture 23, a second fixture 22, a third fixture 21, a water tank 27, a flow-guiding injection device 26, a water supply hose 25, an injection head 24, a water pumping header 16, a water pumping hose 20, a water pump 17, and a water trough 18; the first fixture 23, second fixture 22, and third fixture 21 being mounted on the five-axis working platform 19, with the second fixture 22 disposed between the first fixture 23 and the third fixture 21, the injection head 24 being mounted on the top of the first fixture 23, and connected to the flow-guiding injection device 26 via the water supply hose 25, the water inlet tube of the flow-guiding injection device 26 being connected to the water tank 27, the water pumping header 16 being mounted on the top of the third fixture 21, and being connected to the water pump 17 via the water pumping hose 20, the water outlet of the water pump 17 being connected to the water trough 18, the laser 10 being disposed right above the five-axis working platform 19, and the light path conversion system 13 being disposed between the laser 10 and the five-axis working platform 19.

The flow-guiding injection device 26 is designed to control the pressure and flow of the water stream, so that the water pressure is controlled within a range of 0.1 MPa and ~0.3 MPa, and the inlet flow rate is controlled within a range of $0.8 \times 10^{-5}$ m$^3$/s and ~$2.0 \times 10^{-5}$ m$^3$/s.

The outlet flow rate of the water pump is within a range of $0.8 \times 10^{-5}$ m$^3$/s and ~$2.0 \times 10^{-5}$ m$^3$/s, so that the water inflow rate is equal to the water outflow rate in the water confinement layer on the bottom of the tenon groove, to ensure a uniform water film.

The injection head 24 is flat-shaped, and the water outlet in the end surface of the injection head 24 has a width of 1.5 mm and a length of 10 mm.

The water pumping header 16 is flat-shaped, and the water outlet in the end surface of the water pumping header 16 has a width of 1.5 mm and a length of 10 mm.

The device can be used through the following steps:

Apply a black paint or aluminum foil absorbing layer on the bottom surface of a tenon groove of a blade, and then mount the blade onto the second fixture 22 and keep the bottom surface of the tenon groove in level state;

Mount the injection head 24 onto the top of the first fixture 23 in a way that the end surface of water outlet of the injection head 24 closely abuts one end surface of the bottom of the tenon groove, and the bottom surface of the water outlet of the injection head 24 is in the same plane as the bottom surface of the tenon groove, and the two sides of the water outlet are at the outer side of the side surfaces of the bottom of tenon groove;

Connect the injection head 24 and flow-guiding injection device 26 with the water supply hose 25, and then connect the water inlet tube of the flow-guiding injection device 26 to the water tank 27;

Mount the water pumping header 16 onto the top of the third fixture 21 in a way that the end surface of water inlet of the water pumping header 16 closely abuts the other end surface of the bottom of the tenon groove, the bottom surface of the water inlet of the water pumping header 16 is in the same plane as the bottom surface of the tenon groove, and the two sides of the water inlet are at the outer side of the side surfaces of the bottom of the tenon groove;

Connect the water pumping header 16 and water pump 17 with the water pumping hose 20, and then connect the water outlet tube of the water pump 17 to the water trough 18;

Set the facula diameter, pulse energy, and pulse width of the laser by the laser control unit 11;

Change the laser beam with a circular facula into a laser beam with a strip-shaped facula and high-power density via the light path conversion system 13, and ensure the laser beam with a strip-shaped facula is perpendicular to the horizontal plane and the focal spot of the laser beam is on the bottom surface of the tenon groove;

Adjust the parameters of the flow-guiding injection device 26 and water pump 17, to form a uniform and stable water confinement layer with appropriate thickness on the bottom of the tenon groove;

Switch on the laser and start laser shock peening for the bottom surface of the tenon groove, and complete the peening for the entire bottom surface of the tenon groove by translating the working platform.

The technical innovation of this disclosure lies in the geometric characteristics of the bottom of a tenon groove, a light path conversion system 13 utilized to change the circular facula of a laser beam into a strip-shaped facula with high-power density, so as to carry out laser shock peening for the bottom surface of the tenon groove, avoid a "plasma shielding" phenomenon, and at the same time, the processing efficiency is ensured; a flow-guiding injection device 26 and a water pumping device are utilized, and the flow parameters at the water inlet and water outlet on the bottom of the tenon groove are controlled, to ensure a uniform and stable water confinement layer on the bottom of the tenon groove.

This disclosure has the following beneficial effects: by means of laser shock peening for the bottom surface of a tenon groove of an aircraft blade tenon, the occurrence and development of fatigue cracks on the bottom of the tenon groove can be inhibited, the occurrence of phenomena such as blade looseness, vibration, or unbalance, etc., can be avoided, and the engine safety and reliability can be improved.

BRIEF DESCRIPTION OF THE DRAWINGS

FIG. 3 is a schematic diagram of laser shock peening for the bottom surface of a tenon groove of an aircraft blade;

FIG. 4 is a schematic diagram of the end surface of water outlet of an injection head;

FIG. 5 is a schematic diagram of the end surface of water inlet of a water pumping header;

Among the figures: 1—blade, 2—bottom surface of tenon groove, 3—tenon, 4—plasma, 5—laser, 11—laser control unit, 12—laser beam with a circular facula, 13—light path conversion system, 14—laser beam with a strip-shaped facula, 15—blade, 16—water pumping header, 17—water pump, 18—water trough, 19—five-axis working platform, 20—water pumping hose, 21—third fixture, 22—second fixture, 23—first fixture, 24—injection head, 25—water supply hose, 26—flow-guiding injection device, 27—water tank, 30—end surface of water outlet of injection head, 31—end surface of water inlet of water pumping header, 32—processing path, 41—point A, 42—point B, 43—point C, 44—point D, 45—point E, 46—point F;

The height H1 of the water outlet is 1.5 mm, and the length L1 is 10 mm.

The height H2 of the water outlet is 1.5 mm, and the length L2 is 10 mm.

DETAILED DESCRIPTION

Hereunder, this disclosure will be further detailed with reference to the accompanying drawings.

Embodiment 1

Figure 1:
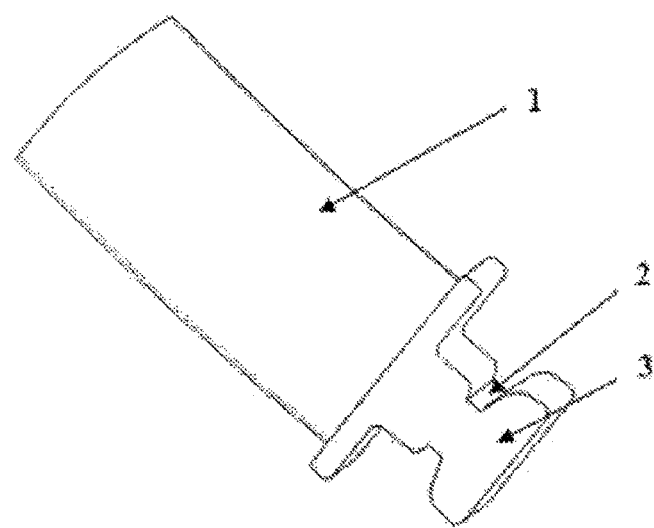
FIG. 1 is a schematic diagram of an aircraft blade.
Figure 2:
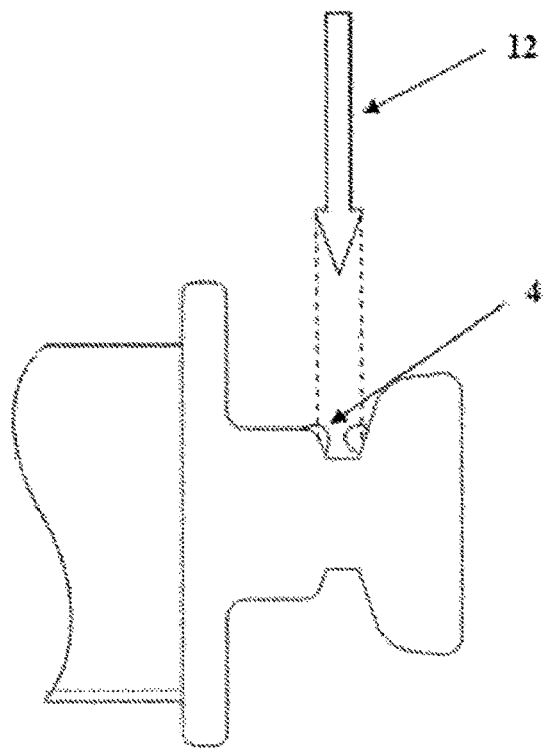
FIG. 2 is a schematic diagram of "plasma shielding;"

During the surface peening for the bottom surface of the tenon groove of the aircraft blade 1 shown in FIG. 1, a laser shock peening device for the bottom surface of a tenon groove of an aircraft blade shown in FIG. 3 is utilized to avoid the "plasma shielding" effect shown in FIG. 2. The device comprises: a laser 10, a laser control unit 11, a light path conversion system 13, a five-axis working platform 19, a first fixture 23, a second fixture 22, a third fixture 21, a water tank 27, a flow-guiding injection device 26, a water supply hose 25, an injection head 24, a water pumping header 16, a water pumping hose 20, a water pump 17, and a water trough 18, wherein, the end surface of water outlet of injection head 24 and the end surface of water inlet of water pumping header 16 are shown in FIGS. 4 and 5, respectively.

The first fixture 23, second fixture 22, and third fixture 21 are mounted on the five-axis working platform 19, and the second fixture 22 is disposed between the first fixture 23 and the third fixture 21, the injection head 24 is mounted on the top of the first fixture 23, and is connected to the flow-guiding injection device 26 via the water supply hose 25, and the water inlet tube of the flow-guiding injection device 26 is connected to the water tank 27, the water pumping header 16 is mounted on the top of the third fixture 21, and is connected to the water pump 17 via the water pumping hose 20, and the water outlet of the water pump 17 is connected to the water trough 18, the laser 10 is disposed right above the five-axis working platform 19, and the light path conversion system 13 is disposed between the laser 10 and the five-axis working platform 19.

Embodiment 2

Figure 6:
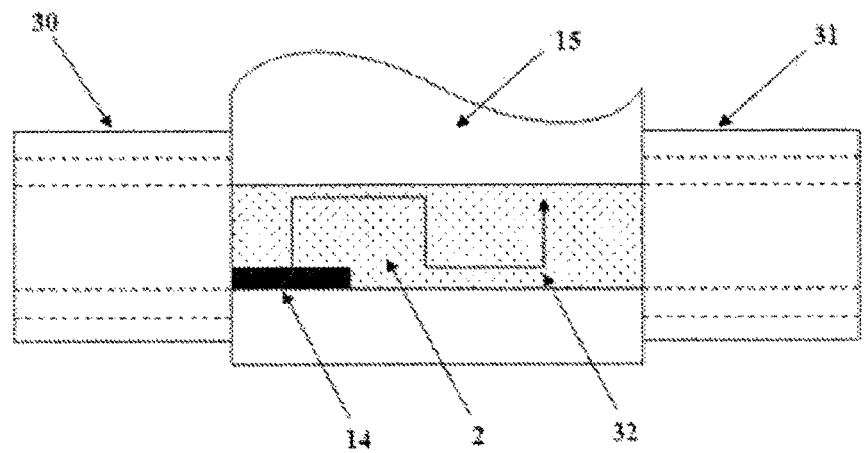
FIG. 6 is a schematic diagram of the processing path of laser shock peening.
Figure 7:
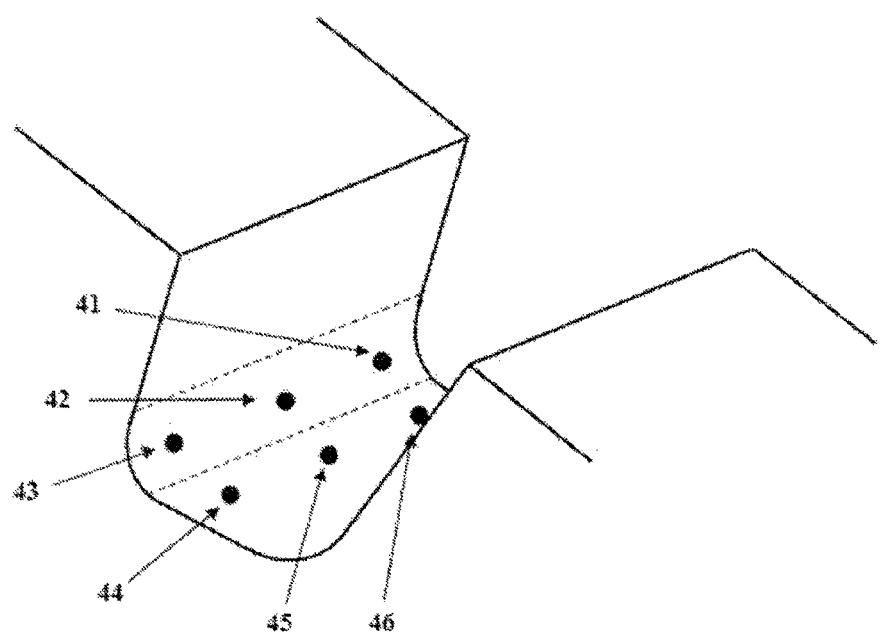
FIG. 7 is a schematic diagram of sampling points for residual stress testing of the bottom surface of a tenon groove.

The device can be used through the following steps:

Apply a black paint or absorbing layer on the bottom surface 2 of a tenon groove of a blade, and then mount the blade 15 onto the second fixture 22 and keep the bottom surface 2 of the tenon groove in level state;

Mount the injection head 24 onto the top of the first fixture 23 in a way that the end surface 30 of water outlet of the injection head 24 closely abuts one end surface of the bottom of the tenon groove, and the bottom surface of the water outlet of the injection head 24 is in the same plane as the bottom surface 2 of the tenon groove, and the two sides of the water outlet are at the outer side of the side surfaces of the bottom of the tenon groove;

Connect the injection head 24 and flow-guiding injection device 26 with the water supply hose 25, and then connect the water inlet tube of the flow-guiding injection device 26 to the water tank 27;

Mount the water pumping header 16 onto the top of the third fixture 21 in a way that the end surface 31 of water inlet of the water pumping header 16 closely abuts the other end surface of the bottom of the tenon groove, the bottom surface of water inlet of the water pumping header 16 is in the same plane as the bottom surface 2 of the tenon groove, and the two sides of the water inlet are at the outer side of the side surfaces of the bottom of the tenon groove;

Connect the water pumping header 16 and water pump 17 with the water pumping hose 20, and then connect the water outlet tube of the water pump 17 to the water trough 18;

Set the facula diameter to 3 mm, pulse energy to 5 J, and pulse width to 10 ns for the laser with the laser control unit;

Change the laser beam 12 with a circular facula into a laser beam 14 with high-power density and a strip-shaped facula having a width of 0.5 mm and a length of 14 mm via the light path conversion system 13, and ensure the laser beam 14 with a strip-shaped facula is perpendicular to the horizontal plane and the focal spot of the laser beam 14 with a strip-shaped facula is on the bottom surface 2 of the tenon groove;

Adjust the parameters of the flow-guiding injection device 26 and water pump 17, so that the water pressure is 0.1 MPa and both of the flow rates are $0.8 \times 10^{-5}$ m3/s, to create a uniform and stable water confinement layer having a thickness of 1 mm-2 mm on the bottom of the tenon groove;

Switch on the laser 10 and start laser shock peening for the bottom surface 2 of the tenon groove, and complete the peening for the entire bottom surface 2 of the tenon groove by translating the five-axis working platform 19 along the processing path 32 shown in FIG. 6;

After the processing, carry out a residual stress test at the points labeled in FIG. 7, to evaluate the effect of laser shock peening for the bottom surface of the tenon groove of the aircraft blade.

Embodiment 3

Use the same method and steps as in Embodiment 2, but change the pulse energy to 6 J, pulse width to 20 ns, width of strip-shaped facula to 1 mm, length of strip-shaped facula to 7 mm, water pressure in the flow-guiding injection device 26 and water pump to 0.2 MPa, and flow rates to $1.5 \times 10^{-5}$ m$^3$/s.

Embodiment 4

Use the same method and steps as in Embodiment 2, but change the pulse energy to 12 J, pulse width to 30 ns, width of strip-shaped facula to 2 mm, length of strip-shaped facula to 3.5 mm, water pressure in the flow-guiding injection device 26 and water pump to 0.3 MPa, and flow rates to $2.0 \times 10^{-5}$ m$^3$/s. As can be seen from Table 1, the method disclosed herein can effectively introduce 200 MPa or higher residual compressive stress into the bottom surface of the tenon groove of the aircraft blade, and thereby improve the service life of the aircraft blade.

TABLE 1

Result of Residual Stress Test of the Bottom Surface of the Tenon Groove of the Aircraft Blade in the Embodiments

| Sample | Residual Stress before Laser Shock Peening (MPa) | | | | | |
|---|---|---|---|---|---|---|
| (Material TC4) | Point A | Point B | Point C | Point D | Point E | Point F |
| Embodiment 2 | 10 | 8 | 9 | 4 | 3 | 5 |
| Embodiment 3 | 6 | 9 | 6 | 2 | 7 | 8 |
| Embodiment 4 | 8 | 5 | 7 | 6 | 4 | 2 |

| Sample | Residual Stress after Laser Shock Peening (MPa) | | | | | |
|---|---|---|---|---|---|---|
| (Material TC4) | Point A | Point B | Point C | Point D | Point E | Point F |
| Embodiment 2 | −286 | −267 | −278 | −304 | −312 | −320 |
| Embodiment 3 | −346 | −352 | −349 | −397 | −406 | −414 |
| Embodiment 4 | −432 | −443 | −436 | −482 | −495 | −510 |

In Table 1: positive values represent tensile stress, while negative values represent compression stress.

The invention claimed is:

1. A laser shock peening method for a bottom surface of a tenon groove of an aircraft blade, the method comprising:
    changing a laser beam with a circular facula into a laser beam with a strip-shaped facula and high power density, so as to carry out laser shock peening for the bottom surface of a tenon groove that is covered by an absorbing layer, according to the geometric characteristics of the bottom of the tenon groove; wherein the laser beam with the strip-shaped facula has a width between 0.5 mm and 1 mm, a length between 7 mm and 14 mm, and pulses providing between 5 J and 12 J of energy per pulse with a pulse width between 10 ns and 30 ns; and
    utilizing a flow-guiding injection device and a water pumping device to control water flow parameters at a water inlet and a water outlet on the bottom of the tenon groove respectively, to create a water confinement layer having a thickness from 1 mm to 1.5 mm.

2. The method according to claim 1, further comprising forming material of the aircraft blade proximate the bottom surface of the tenon groove to have a residual compressive stress of at least 200 MPa.

3. The method according to claim 2, wherein translating the aircraft blade along a processing path relative to the laser beam with the strip-shaped facula comprises translating the blade in at least two mutually perpendicular directions, each perpendicular to a direction of the laser beam with the strip-shaped facula.

4. The method according to claim 1, further comprising translating the aircraft blade along a processing path relative to the laser beam with the strip-shaped facula.

5. The method according to claim 1, wherein utilizing a flow-guiding injection device and a water pumping device to control water flow parameters comprises forming a water confinement layer having a uniform and stable thickness.

* * * * *